United States Patent [19]

Kimura et al.

[11] Patent Number: 5,572,418
[45] Date of Patent: Nov. 5, 1996

[54] QUASI-RESONANT PWM INVERTER

[75] Inventors: Gunji Kimura; Toshihisa Shimizu; Akio Toba; Shigeru Sano, all of Tokyo, Japan

[73] Assignee: Yuasa Corporation, Osaka Prefecture, Japan

[21] Appl. No.: 294,398

[22] Filed: Aug. 23, 1994

[30] Foreign Application Priority Data

Aug. 23, 1993 [JP] Japan ................................ 5-229488

[51] Int. Cl.$^6$ ...................................................... H02M 3/24
[52] U.S. Cl. .................... 363/97; 363/98; 363/132
[58] Field of Search ............................ 363/97, 131, 132, 363/139, 135, 137

[56] References Cited

U.S. PATENT DOCUMENTS 4,785,387  11/1988  Lee et al. .................................. 363/21
5,172,309  12/1992  DeDoncker et al. ................... 363/132
5,245,520   9/1993  Imbertson ............................... 363/17

Primary Examiner—Peter S. Wong
Assistant Examiner—Shawn Riley
Attorney, Agent, or Firm—Watson Cole Stevens Davis, P.L.L.C.

[57] ABSTRACT

A quasi-resonant PWM inverter performs stable resonant operation utilizing a simple control system and a highly efficient inverter operation. A first condenser is connected between a connecting point between first and second main switches and to the first side of the first main switch. A second condenser is connected between the connecting point and the second side of the second main switch. The respective first and second sides of the first main switch and second main switch are connected to a DC power source having a first dividing point for the first potential and a second dividing point for the second potential. A terminal of a first auxiliary switch is connected to the first dividing point; and a terminal of a second auxiliary switch is connected to the second dividing point. A reactor is connected between the connecting points of the first and second auxiliary switches and the first and second main switches.

2 Claims, 11 Drawing Sheets

TIME : 20 μsec/div      Ir : 1 A/div
vo : 50 V/div

TIME : 2 μsec/div      Ir : 1 A/div
vo : 50 V/div

TIME : 2 μsec/div    ir : 1 A/div
vo : 50 V/div

TIME : 2 μsec/div    Ir : 2 A/div
vo : 20 V/div    Io : 1 A/div
DUTY RATIO : 0.2

PRIOR ART

PRIOR ART

QUASI-RESONANT PWM INVERTER

BACKGROUND OF THE INVENTION

1. Field of the Invention

The present invention is directed to a quasi-resonant PWM inverter.

2. Description of the Prior of Art

Some electrical devices such as semiconductor power conversion systems have been miniaturized owing to a trend of the higher switching frequency. On the other hand, it has been recognized that with the production of power inverters there exist problems of ever-increasing switching losses. In order to overcome this problem, several inverter circuits have been proposed; including low loss inverters circuit of the resonant type. Soft switching is achieved in such devices by means of a resonant circuit, allowing the inverter to operate at various MHz frequencies in a small capacity switching power source.

However, An inverter of this type requires additional components to serve a full function, so that there would be some problems when this type of inverter is applied to a large output inverter. Moreover, since it, performs by means of utilizing a resonant type of operation, said inverter necessitates employing of specific switching elements which should have higher ratings than the normal types of inverters. Furthermore, in order to achieve soft switching, the resonant voltage as well as the resonant current are usually fixed at a certain level according to the basis of the maximum out-put condition, so that an identical resonant waveform will be generated even in cases of the low out-put conditions, the conduction loss might increase and the efficiency would be reduced. Moverover, since the resonant frequency is generally constant, the operational frequency in the inverter will be restricted and the degree of freedom for the out-put variability will be also restricted; and accordingly, the control of the inverter becomes complicated. This is a normally recognized trend that has been a common feature that takes place among the resonant type inverters.

In order to, solve the aforementioned problems, a resonant commutated pole inverter was proposed, which will be described by referring to the attached FIGS. 13 and 14. FIG. 13 is a circuit configuration of the resonant commutated pole inverter, while FIG. 14 is a characteristic diagram of said resonant commutated pole inverter.

As seen in FIG. 13, the resonant commutated poke inverter is composed of main switches S1, S2, auxiliary switches S1s, S2s, a reactor for resonance Lr. condensors for resonance having an equal capacity Cr1, Cr2, and condensors Cd whose action is to clamp the middle point of DC power source. With said resonant commutated pole inverter, the middle point voltage, E/2, of the DC power source is divided by the condensors Cd.

As in the characteristic diagram as seen in FIG. 14, the waveforms at certain locations are shown when the diode D2 in the main switch S2 is commutated to the main switch S1. Suppose that the output current, Io, is positive and said current, Io, is kept constant during a period of time that has been commutated; when the auxiliary switch S1s turned on under a condition in which the output current is being circulated to the diode D2, the current Ir flowing in the reactor Lr for resonance will be increasing linearly. With this condition, when Ir=Io, the current flowing in the diode D2 will become nil and the current flowing in a transistor in the main switch. S2 will become Ir–Io.

At a moment when the current Ir–Io, reaches the preset current value, Ibt, and if the transistor of the main switch S2 is turning off, then the resonant operation will start, the voltage, Vo, of the condenser Cr2 for the resonance will increase as a result of said resonant operation, Once the voltage reaches the power source voltage, E, the diode D1 in the main switch S1 Will be on. At this moment, the current flowing in the diode D1 becomes Ir–Io and will decrease linearly. By providing an ON-signal to the transistor in the main switch S1 during the time of conduction of the diode D1, lossless switching In the main switch S1 will be achieved, When Ir=0, the output current will be supplied through the main switch S1 and this will lead to complete the commutating operation.

In the previously described case, the current, Ibt turning off the transistor in the main switch S2 compensates the losses that are present in the resonance circuit; including the voltage drop loss in switches or diodes, copper loss or iron loss in the reactor Lr for resonance, and loss that occurs to internal resistance in condensors Cr1, Cr2 for resonance. Moreover, said current is continuously supplied in order to raise the voltage of the condenser Cr2 for resonance up to the power source voltage E. If the current Ibt is less than the optimum value, the level of the voltage Vo of the condenser Cr2 for resonance might not be able to be raised to the power source voltage, E.

As a result, the main switch S1 will be turned-on while electric charge is remaining in the condensor Cr1 which is connected in parallel to said main switch S1. Hence a large loss will be expected to take place inside the main switch S1, and this might lead to a problem such, that element will be likely subjected to a thermal failure.

In contrast, when the current Ibt exceeds the optimum value the resonant current amplitude will become large, so that the conduction loss increases and a certain time required to the commutation operation, in other words dead time, changes, and the output variable range can not be properly secured.

Thus the control of the current Ibt should be done appropriately for said resonant commutated pole inverter and when it is applied to inverters that have more than a medium output power level including IGBT, BJT, GTO or the like, influence of delay time of switching is more, likely to become a serious problem. As has been already explained, since the current Ibt is controlled by a timing of turning-off the main switch S2, a complicated control system including a current feedback mode is necessitated so that it will act to compensate for the switching delay time and to determine the current, Ibt, precisely. Moreover, since the switching elements with relatively large voltage ratings will generally exhibit high voltage drop, the loss inside the resonant circuit will increase and in turn the required current Ibt will also raise and the influence of the delay time will become remarkable.

SUMMARY OF THE INVENTION

In order to overcome aforementioned technical problems associated to the use of the conventional types of resonant commutated pole inverters, it is, therefore, and object of the present invention to provide a quasi-resonant PWM inverter with which the control can be easily performed, the resonant operation will be stable, and more efficient operation can be performed.

In a first embodiment of the present invention a first condensor is connected at one end to a connecting point between first side of terminals of the first main switch and the second side of terminals of the second main switch and at the other end to the other side of terminals of said first main switch. A second condensor is connected at one end to said connecting point and to the first side of terminals of said second main switch. The DC power source is connected between the second side of terminals of said first main switch and the first side of terminals of said second main switch; said DC power source includes a first dividing point having a first potential and a second dividing point a second potential. The second side of terminals of a first auxiliary switch is connected to said first dividing point, and first side terminals of a second auxiliary switch is connected to the second dividing point. A reactor is connected between a connecting point between the first side of terminals of said first auxiliary switch to the other second side of terminals of said second auxiliary switch, and to the connecting point between said first and second main switches.

According to a second embodiment of the invention, the first and second auxiliary power sources are connected at a dividing point so that they will act to divide said DC power source in order to form a first potential point having the first potential and a second potential point having the second potential. The second side of terminals of the first auxiliary switch are connected to said first potential point, and the first side of terminals of the second auxiliary switch is also connected to said second potential point.

A first dividing point has a first potential and a second dividing point which has a second potential. The DC power source is connected between the second side of terminals of the first main switch and the first side of terminals of the second main switch. The second side of terminals of the first auxiliary switch is connected to said first dividing point or the first potential point, and the first side of terminals of the second auxiliary switch is also connected to said second dividing point or the second potential point. The first side of terminals of said first auxiliary switch is connected to second side of terminals of said second auxiliary switch. Furthermore, the reactor is connected between said connecting point and a connecting point to connect the first and second main switches. Hence, the potential of the condenser can raise to the DC power source voltage without controlling the turn-off timing of each main switch and loss-less switching can be obtained.

DETAILED DESCRIPTION OF PREFERRED EMBODIMENTS

Figure 1:
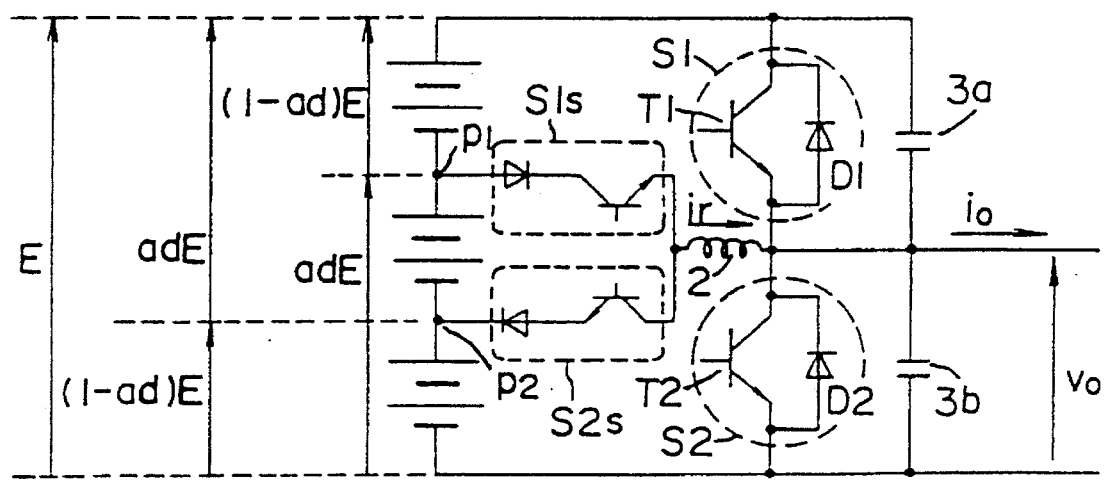
FIG. 1 is a schematic diagram of a circuit configuration to show a structure of the first embodiment of the present invitation.
Figure 2:
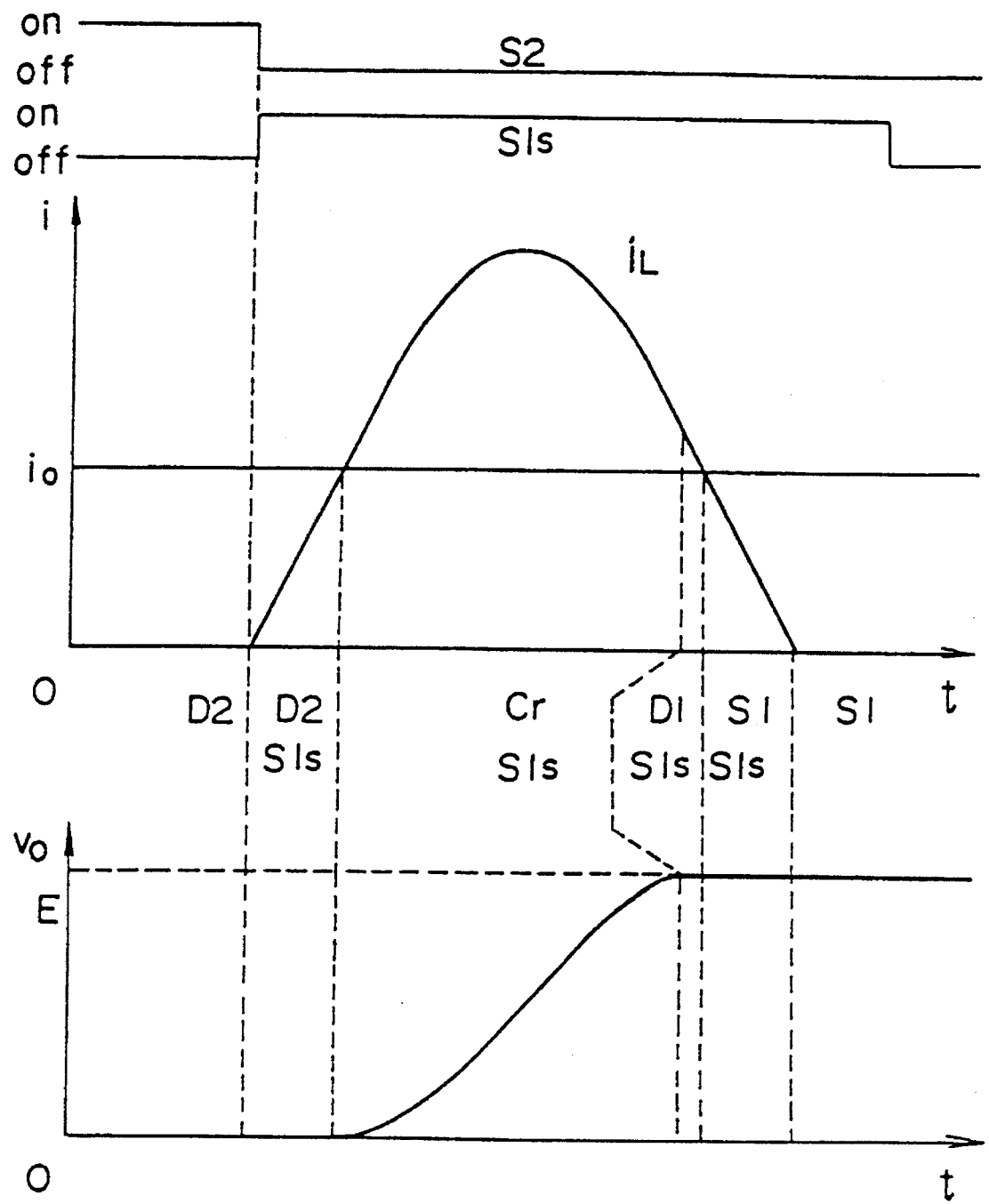
FIG. 2 is a characteristic diagram to show a commutation operation of the embodiment of the present invention.

The first embodiment of the present invention will be described by referring to FIGS. 1 and 2. FIG. 1 is a circuit configuration showing a structure of the first embodiment while FIG. 2 shows a characteristic diagram of operation of said embodiment.

As seen in FIG. 1, dividing points P1, P2 of the DC power source 1 are connected to first side of terminals of the first auxiliary switch S1s and the second auxiliary switch S2s, respectively. Each of said auxiliary switches comprises a series connected circuit of a diode and a transistor. The second side of terminals of said first auxiliary switch S1s and the second auxiliary switch S2s are connected to the first side of a reactor 2 for resonance. A first main switch S1 comprises a parallel connected diode D1 and a transistor T1. A second main switch S2 comprises a parallel connected diode D2 and a transistor T2, the first and second switches are connected between the other side of terminals of the reactor 2 for resonance and the electrodes of the DC power source 1. Condensers 3a, 3b for resonance have an equal capacity and are connected to said diodes D1, D2 in parallel. The electrode terminals of the condensor 3b serve as output terminals.

Voltage dividing points P1, P2 of the DC power source 1 are connected to the first auxiliary switch S1s and the second auxiliary switch S2s, respectively. Each power source is further divided at a ratio given by the following equations provided that ad>0.5.

$$\text{ad};(1-\text{ad}) \tag{1}$$

$$(1-\text{ad});\text{ad} \tag{2}$$

By supplying such divided voltage, the power source voltage for the resonance operation will be represented by adE, which is larger than E/2 at the resonant commutated poles.

As seen in FIG. 2, since the power source voltage for the resonance operation has a value adE during the commutating operation from the diode D2 of the second main switch S2 to the first main switch S1, the output voltage will increase from zero to power source voltage E if the 'ad' is pre-set by considering the loss elements that are to take place inside the resonance circuit without taking into account the Ibt using the conventional type of resonant commutated pole.

In this case, Vo and Ir during the resonance operation by taking into account the resistance component Rr that is present inside the resonance circuit can be approximated by equations (3) and (4):

$$Vo(\omega rt) = adE\{1 - \exp(-\omega rt/2Q) \cos \omega rt\} \quad (3)$$

$$Ir(\omega rt) = (adE/Zr)\exp(-\omega rt/2Q) \sin \omega rt \quad (4)$$

From equations (3) and (4), following equations can be obtained.

$$\omega r = 1(Lr \times Cr)^{1/2} \quad (5)$$

$$Zr = (Lr/Cr)^{1/2} \quad (6)$$

$$Q = Zr/Rr \quad (7)$$

$$Cr = Cr1 + Cr2 \quad (8)$$

where ω is a resonance angular frequency, Zr is a characteristic impedance, Q is a quality of resonance circuit%, Lr is an inductance of reactor 2 for resonance, and Cr is a capacitance of condensors 3a, 3b for resonance.

The limited value of the 'ad' that is needed to perform the soft switching can be obtained by the equation:

$$Vo(\pi) = E \quad (9)$$

In this case, in order to provide an ON-signal to the first main switch S1 during the period of conduction time of the diode D1, it is recommended that an actual 'ad' value should be set to be approximately larger than that obtained from the above equation (9):

The characteristic diagram for operation based on this embodiment will be described as follows:

For this embodiment, five batteries (12 V out-put each) are connected in parallel to serve as a DC power source 1. For setting the values for the inductance Lr of the reactor 2 for resonance and capacitance Cr of condensors 3a, 3b for resonance, it is necessary to consider that resonance period in addition to the resonance current amplitude. Since the resonance operating period represents the dead time and the maximum and minimum values of the duty ratio of the inverter are restricted, a special consideration should be paid as far as it concerns the resonance period. In this embodiment, the resonance period is set in such a way that the dead time per one switching period during the operation period under the maximum output current should be less than 1/10 of the switching period, in order to secure that duty ratio variable range should be from 0.1 to 0.9.

On the other hand, the induction loss that is expected to be taking place inside the resonance circuit can be reduced by means of decreasing the resonance circuit amplitude. In order to have the soft switching acting a way that is functionally effective, parameters were set as follows; namely inductance Lr of the reactor 2 for resonance=8.0 H, capacitance Cr of condensors 3a, 3b for resonance =30 nF, the resonance frequency fr–325 KHz, and characteristic impedance Zr=16.3 Ω.

Since the resistance component Rr that is present inside the resonance circuit is approximately 0.5 Ω, the equation (9) by taking into account the voltage drop that occurs to the diode yields that 'ad'=0.53. Since the DC power source 1 is basically composed of 5 series-connected batteries, it is set that 'ad'=0.6 in this embodiment.

Figure 3:
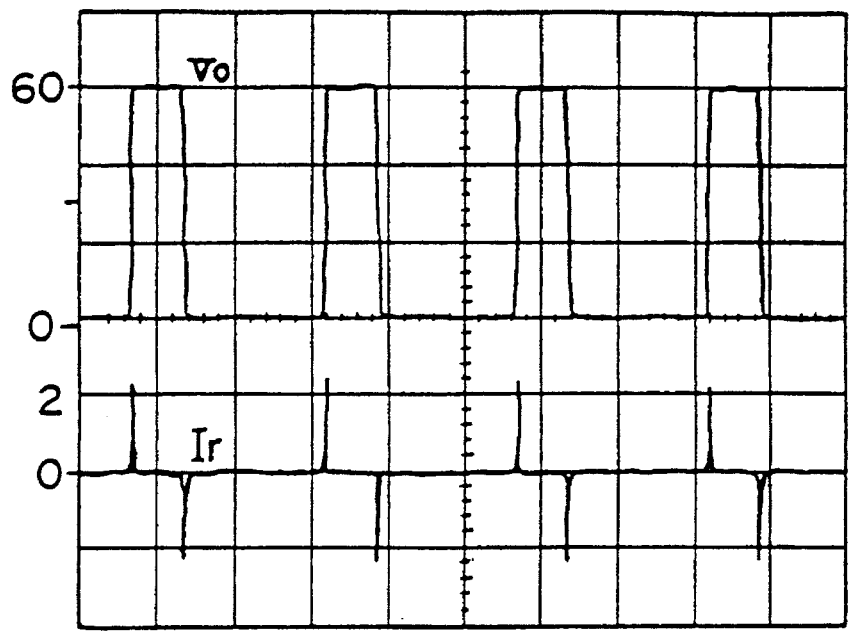
FIG. 3 is a characteristic diagram to show the output voltage when the output terminal is being opened and the current is being flowing to the reactor for resonance, according to the embodiment of the present invention.
Figure 4:
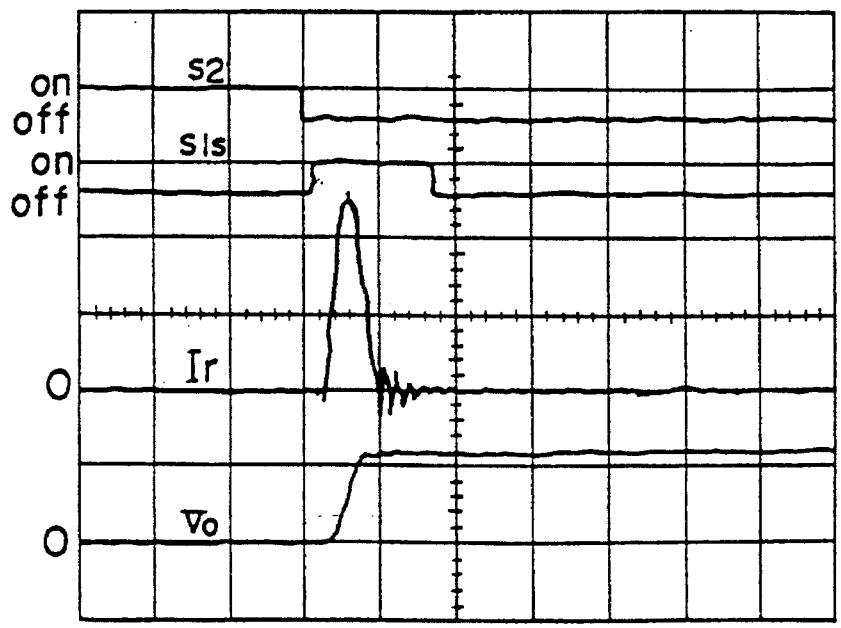
FIG. 4 is a characteristic diagram to show the control signals that are being employed for the second main switch and the first auxiliary switch.

FIG. 3 shows the waveforms of Vo and Ir when the output is opened, indicating that the resonance operation is preformed only during the commutation period, and, therefore, an excellent PWM operation can be achieved. FIG. 4 shows the control signals and the corresponding commutation operation modes for the main switch S2 and the auxiliary switch s1s. In this case, an ON-signal to the auxiliary switch S1s and an OFF-signal to the main switch S2 were provided at approximately the same time.

Figure 5:
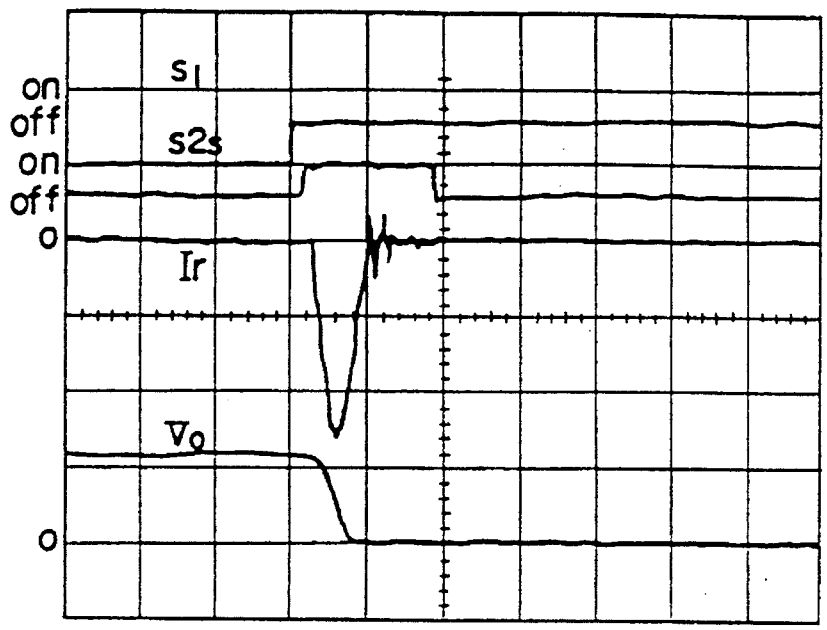
FIG. 5 is a characteristic diagram to show the control signals that are being utilized for the first main switch and the second auxiliary switch.
Figure 6:
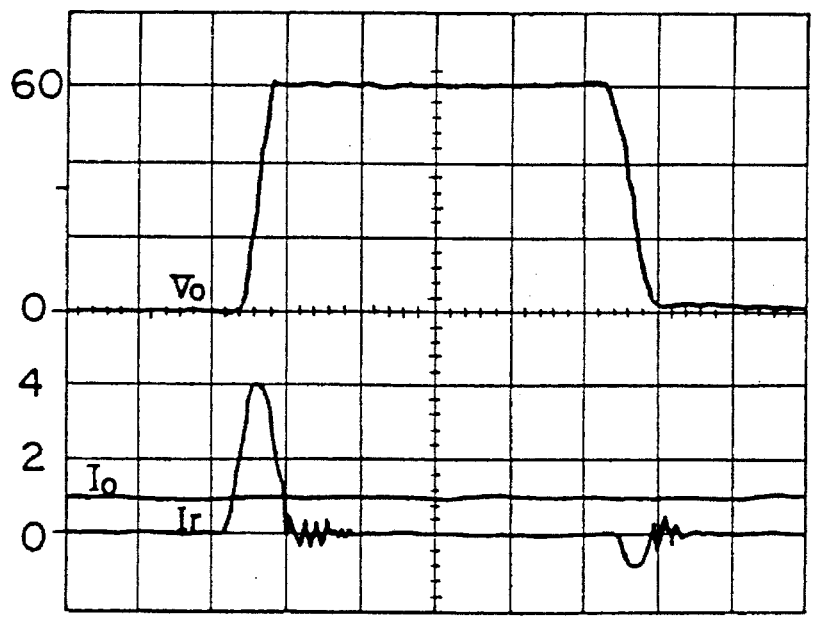
FIG. 6 is a characteristic diagram to show the output voltage when the output current is at a level where Io=1A and the current is flowing to the reactor for the resonance.
Figure 7:
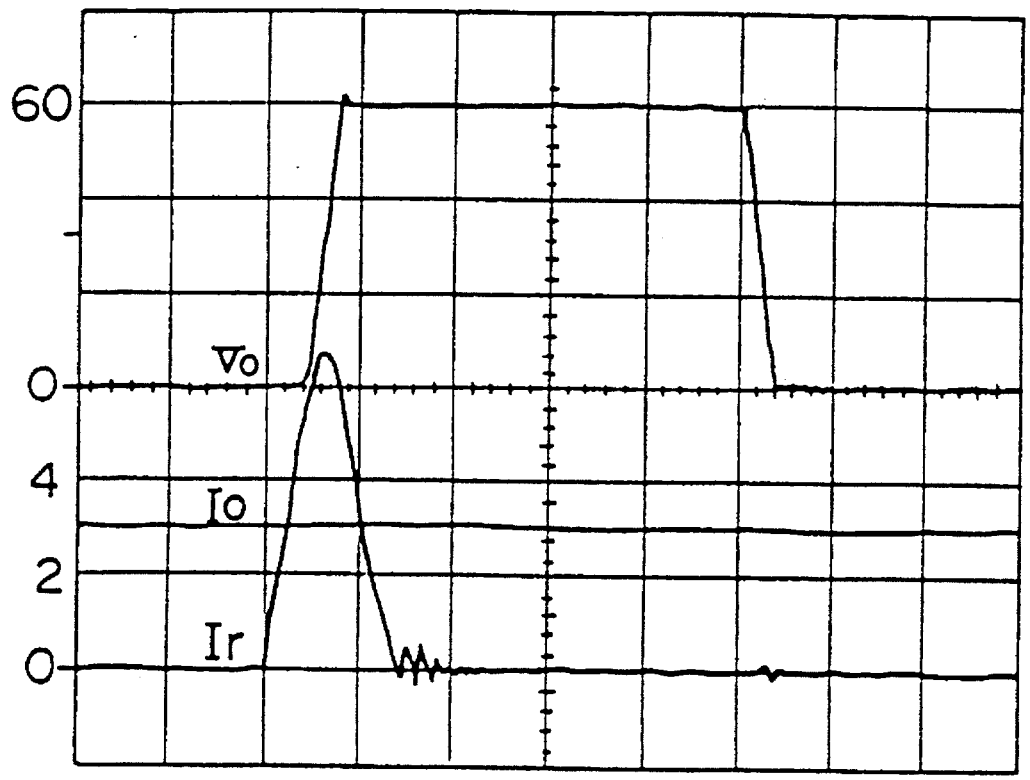
FIG. 7 is a characteristic diagram to show the output voltage when the output current is at a level where Io=3A and the current is flowing to the reactor for the resonance.

FIG. 5 shows the control signals and the corresponding commutation operation modes for the main switch S1 and the auxiliary switch S2s. FIGS. 6 and 7 show the operation modes of the inverter when the output current, Io, is 1A (FIG. 6) and 3A (FIG. 7), respectively. Both of these figures indicate that the switching operation can be performed in a stable fashion, regardless of the magnitude of the output current.

As described above, since the resonance operation is designed to be limited only at the moment of the commutation, true PWM control can be achieved. It is also expected that the switching loss can be largely reduced. Moreover, the rating that is required for the switching operation will be the same as that for the PWM inverter. Furthermore, a stable operation can be achieved by employing a simple control system. Hence, by the use of batteries with which divided voltage can be easily obtained as a power source, an inverter can be provided which is applicable to UPS (uninterruptible power supplies) or electric vehicles which demands higher energy efficiency.

Figure 8:
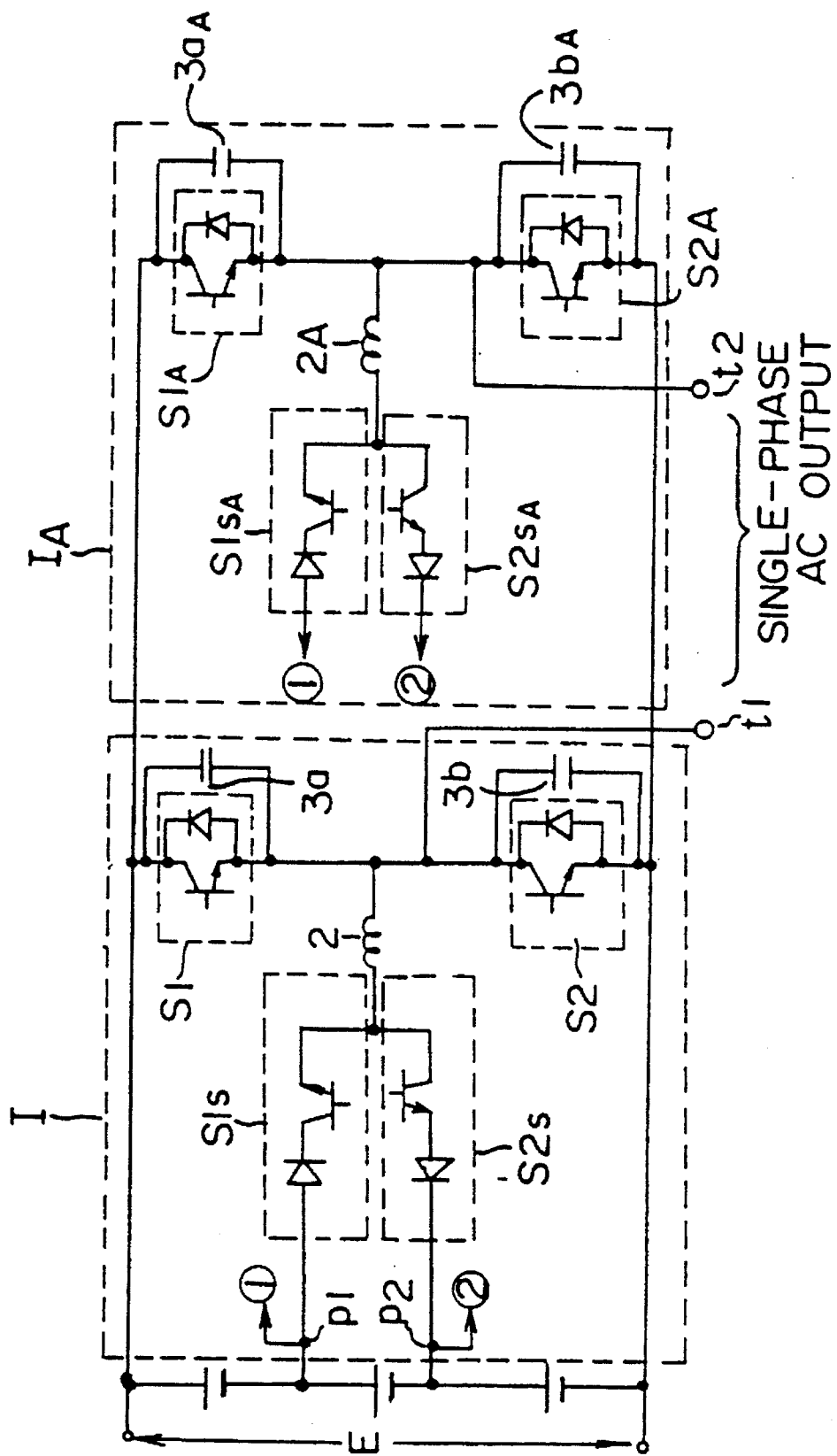
FIG. 8 is a circuit configuration to show the second embodiment of the present invention.

The second embodiment of the present invention will be explained by referring to FIG. 8, which is a circuit diagram to show a structure of this embodiment.

In this embodiment two pairs of quasi-resonant PWM inverters I and IA are structured so that they form a single-phase inverter. The inverter I has been described in the first embodiment. Inverter IA is identical to inverter I. The DC power source E is connected between a connecting point to connect each collector of the transistor of the first main switches S1, S1A to a cathode side of the diode, and a connecting point to connect each emitter of the transistor of the second main switches S2, S2A to an anode side of the diode, The terminals that are located on the diode side of the first auxiliary switches S1s, S1sA are connected to a dividing point P1 of the DC power source E, and terminals that are located on the diode side of the second auxiliary switches S2s, S2sA are connected to a dividing point P2 of the DC power source E. Output terminals t1, t2 are provided at a connecting point to connect the first main switch S1 and the second main switch S2, and a connecting point to connect the first main switch S1A and the second main switch S2A, respectively.

Operational functions of inverters, I,IA of this embodiment are more or less identical as those of the quasi-resonant PWM inverter which has been already described in the first embodiment, According to this second embodiment, a single-phase AC output can be obtained between the out-put terminals t1, t2 according to the output of each inverter I, IA.

As has been described in the above, the embodiment makes it possible that a resonance operation can be limited during a period of time for the commutation, switch loss can be reduced, and a true PWM control can be achieved. Hence, according to this embodiment, a single-phase inverter can be provided, which can be simply structured and in the same time can perform a stable operation by using batteries, of which the dividing voltage can easily be obtained, as a power source.

Figure 9:
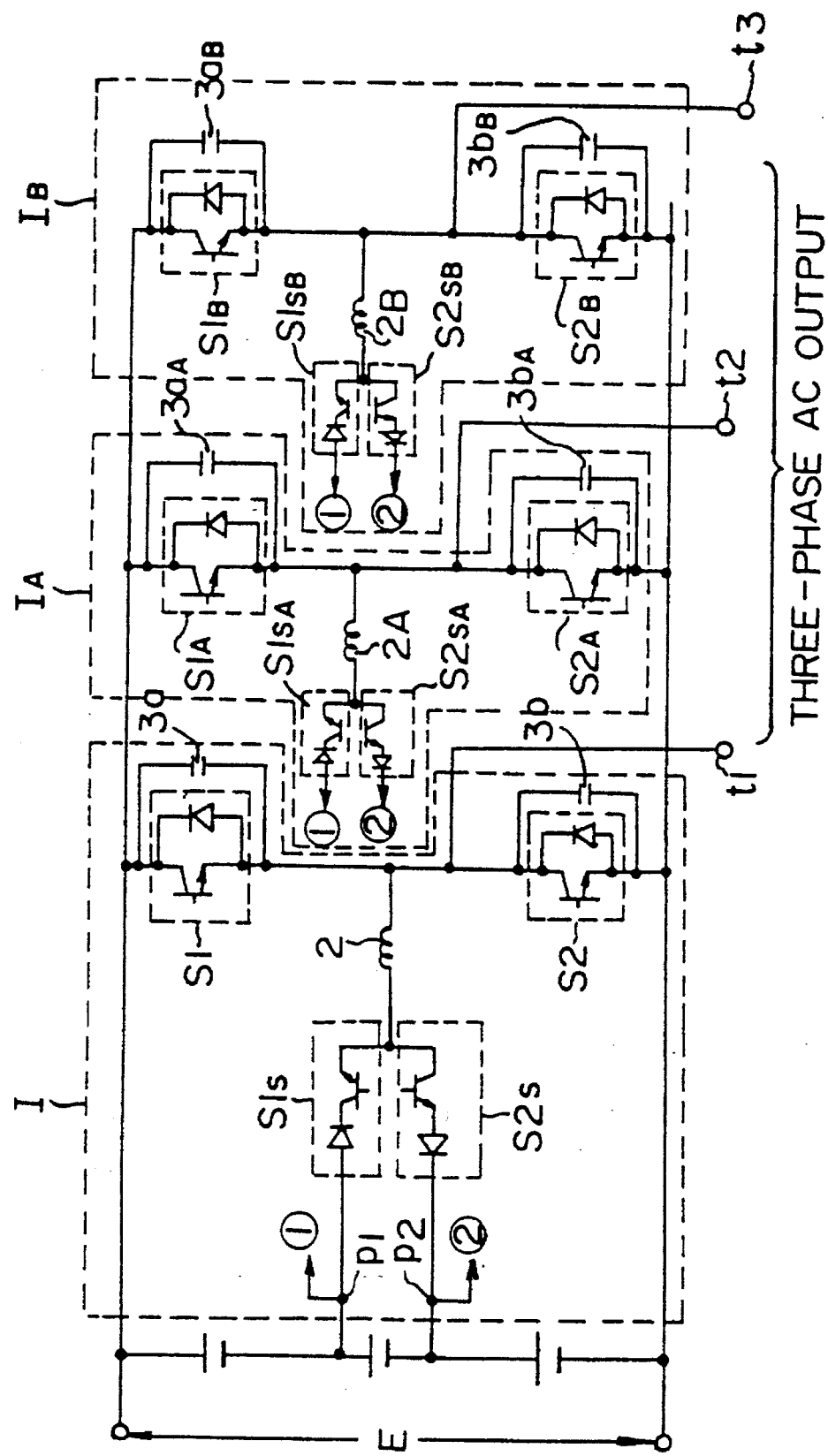
FIG. 9 is a circuit configuration to show the third embodiment of the present invention.

The third embodiment of the present invention will be described by referring to FIG. 9, which is a circuit diagram to show a structure of this embodiment.

In this embodiment, a 3-phase inverter can be structured in such a way to be using three pairs of quasi-resonant PWM inverters which have been described in the first embodiment. The inverter I and inverter IA which had been previously described, and a like inverter IB are provided. The DC power source E is connected between a connecting point to connect each collector of the transistor of the first main switches S1,S1A,S1B to a cathode side of the diode, and a connecting point to connect each emitter of the transistor of the second main switches S2,S2A,S2B to an anode side of the diode.

The terminals located on the diode side of the first auxiliary switches S1s, S1sA, S1sB are connected to a dividing point P1 of said DC power source E, and the terminals located on the diode side of the second auxiliary switches S2s, S2sA, S2sB are connected to a dividing point P2 of said DC power source E. Furthermore, the output terminals t1, t2, t3 are provided to a connecting point to connect the first main switch S1 and the second main switch S2, a connecting point to connect the first main switch S1A and the second main switch S2A, and a connecting point to connect the first main switch S1B and the second main switch S2B, respectively.

Operational functions of the inverters I,IA,IB of this embodiment are more or less identical as those of the quasi-resonant PWM inverter which as been previously described in the first embodiment.

According to this embodiment, a 3-phase AC out-put can be obtained among the output terminals t1,t2,t3 according to the output of each inverter I,IA,IB, respectively.

As has been described in the above, the embodiment makes it possible that a resonance operation can be limited during a period of time for the commutation, switch loss can be reduced, and a true PWM control can be achieved. Hence, according to this embodiment, a 3-phase inverter can be provided, which can be simply structured and can perform a stable operation by using batteries, of which the dividing voltage can easily be obtained, as a power source.

The fourth embodiment of the present invention will be explained by referring to FIG. 10, which is a circuit diagram to show a structure of this embodiment.

Figure 10:
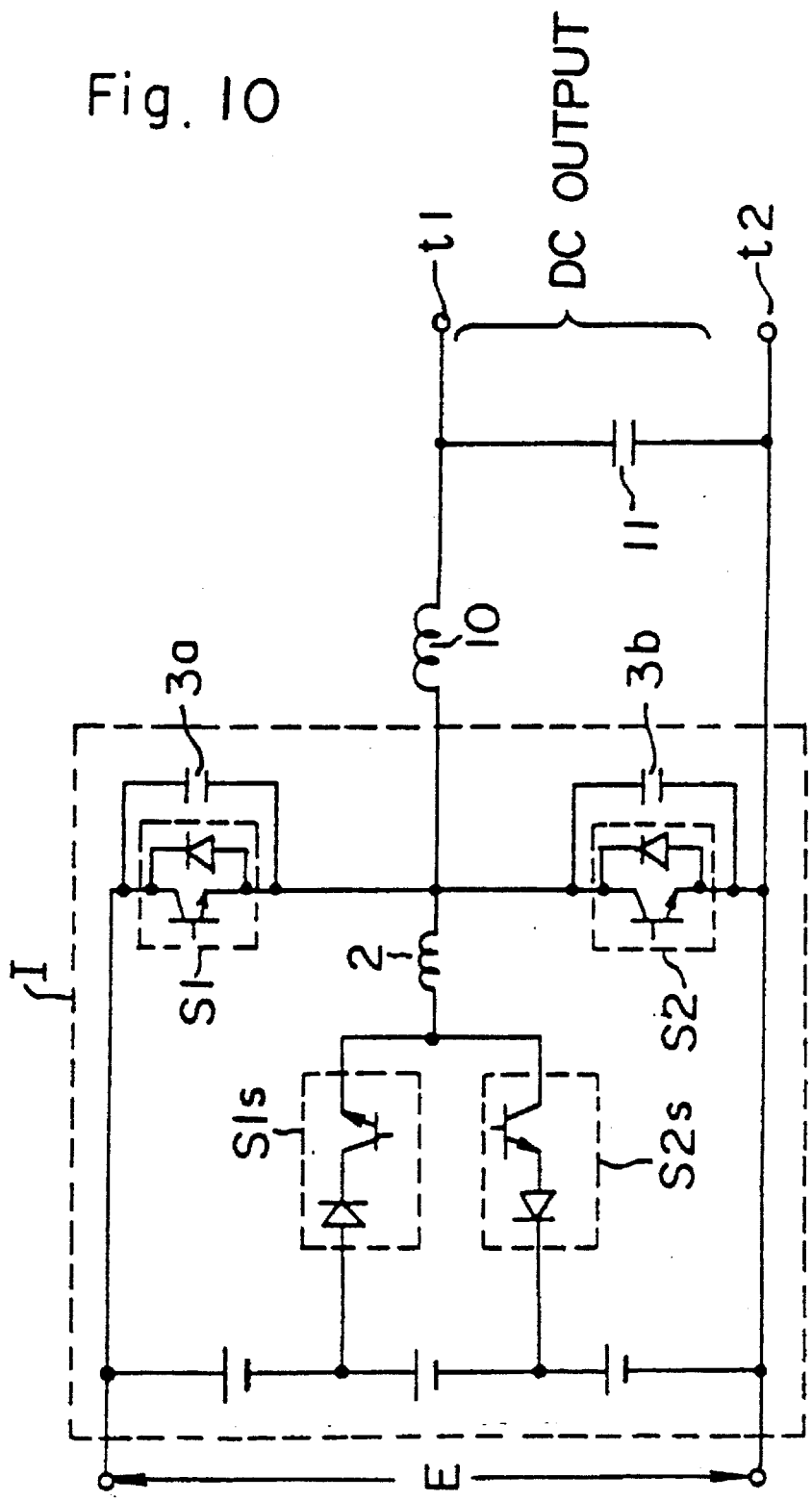
FIG. 10 is a circuit configuration to show the fourth embodiment of the present invention.

This embodiment is directed to the description of a chopper circuit, based on the quasi-resonant PWM inverter which has been already described in the first embodiment, As seen in FIG. 10, one side of terminals of reactor 10 for smoothing is connected to a connecting point for first main switch S1 and second main switch S2 with respect to the inverter 1. A condensor 11 for smoothing is connected between the other side of terminals of the reactor 10 for smoothing and to the DC power source E on the second main switch side S2. On both ends of the condensor 11 for smoothing, the output terminals t1, t2 are provided.

The output of the inverter I through the chopper, according to this embodiment, will be smoothed by means of the reactor 10 and the condensor 11. Thus, smoothed DC output will be obtained from the output terminal in this way.

As has been described in the above, the embodiment makes it possible that a resonance operation can be limited during a period of time for the commutation, switch loss can be reduced, and a true PWM control can be achieved. Hence, according to this embodiment, a chopper circuit can be provided, which can be simply structured and can perform a stable operation by using batteries, of which the dividing voltage can easily be obtained, as a power source.

Figure 11:
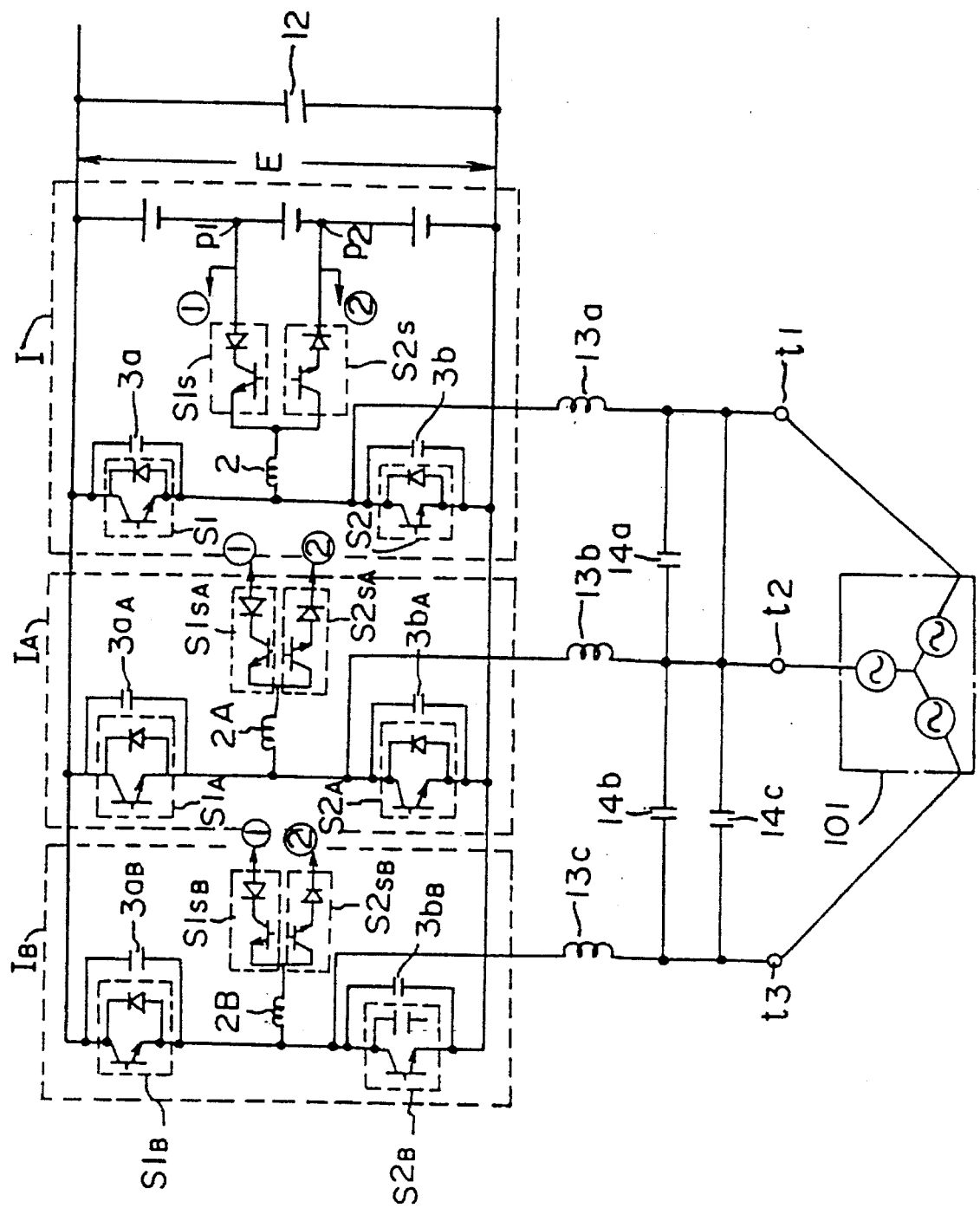
FIG. 11 is a circuit configuration to show the fifth embodiment of the present invention.

The fifth embodiment of the present invention will be explained by referring to FIG. 11, which is a circuit diagram to show a structure of this embodiment.

This embodiment is a 3-phase PWM converter by using three quasi-resonant PWM inverters which had been previously described in the first embodiment.

The DC power source E is connected between a connecting point that is designed to connect each collector of the transistor of the first main switches S1,S1A,S1B of an inverter I, inverter IA, and inverter IB to a cathode side of the diode and a connecting point to connect each emitter of the transistor of the second main switches S2,S2A,S2B to an anode side of the diode. The terminals located on the diode side of the first auxiliary switches S1s,S1sA,S1sB are connected to a dividing point P1 of said DC power source E, and the terminals located on the diode side of the second auxiliary switches S2s,S2sA,S2sB are connected to a dividing point P2.

Moreover, The first side of terminals of a reactor 13a is connected to a connecting point for the first main switch S1 and the second main switch S2, and a first terminal of a 3-phase AC power source 101 is connected to an AC input terminal t1 of a reactor 13a. Similarly the first side of terminals of a reactor 13b is connected to a connecting point for the first main switch S1A and the second main switch S2A, and a second terminal of a 3-phase AC power source 101 connected to an AC input terminal T2 of a reactor 13b. One side of terminals reactor 13c is connected to a connecting point for the first main switch S1B and the second main switch S2B, and a third terminal of a 3-phase AC power source 101 is connected to an AC input terminal t3 of a reactor 13c.

Condensor 12 is connected between the DC power source E, and the DC power is supplied from the DC power source E to the load. Moreover, a condensor 14a is connected between AC input terminals t1,t2, a condensor 14b is connected between AC input terminals t2,t3 and a condensor 14c is connected between AC input terminals t1,t3.

Operational functions of each inverter, I,IA,IB of this embodiment are more or less identical as those of the quasi-resonant PWM inverter which have been described in the first embodiment.

According to this embodiment, a stable DC output power can be obtained among the AC input terminals t1,t2, t3, based on each input voltage of the inverters I,IA,IB.

As has been described in the above, the described embodiment makes it possible that a resonance operation can be limited during a period of time for the commutation, switch loss can be reduced, and a true PWM control can be achieved. Hence, according to this embodiment, a stable DC power source can be provided from the 3-phase AC power source that have the characteristics of having a simple structure by using batteries, by which the dividing of the voltage can easily be obtained, as a power source.

Figure 12:
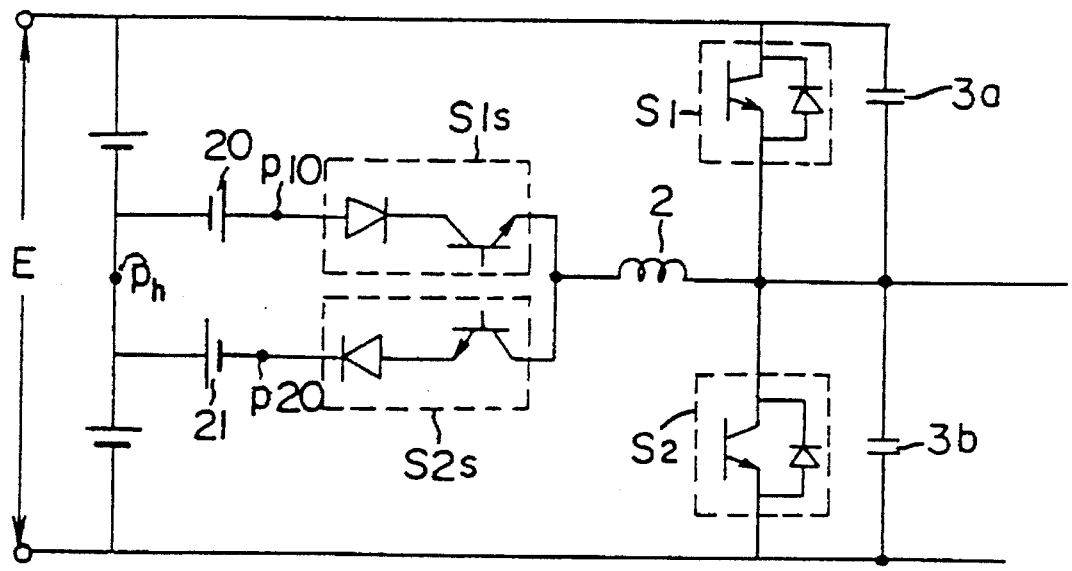
FIG. 12 is a circuit configuration to show the sixth embodiment of the present invention.
Figure 13:
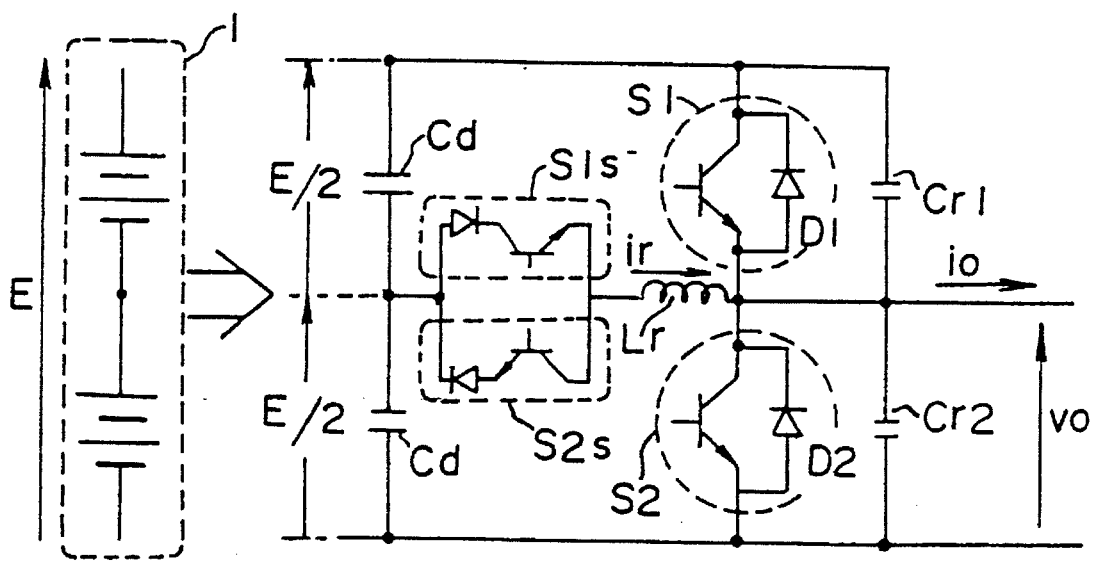
FIG. 13 is a circuit configuration to show a structure of the conventional type of resonant commutated pole.
Figure 14:
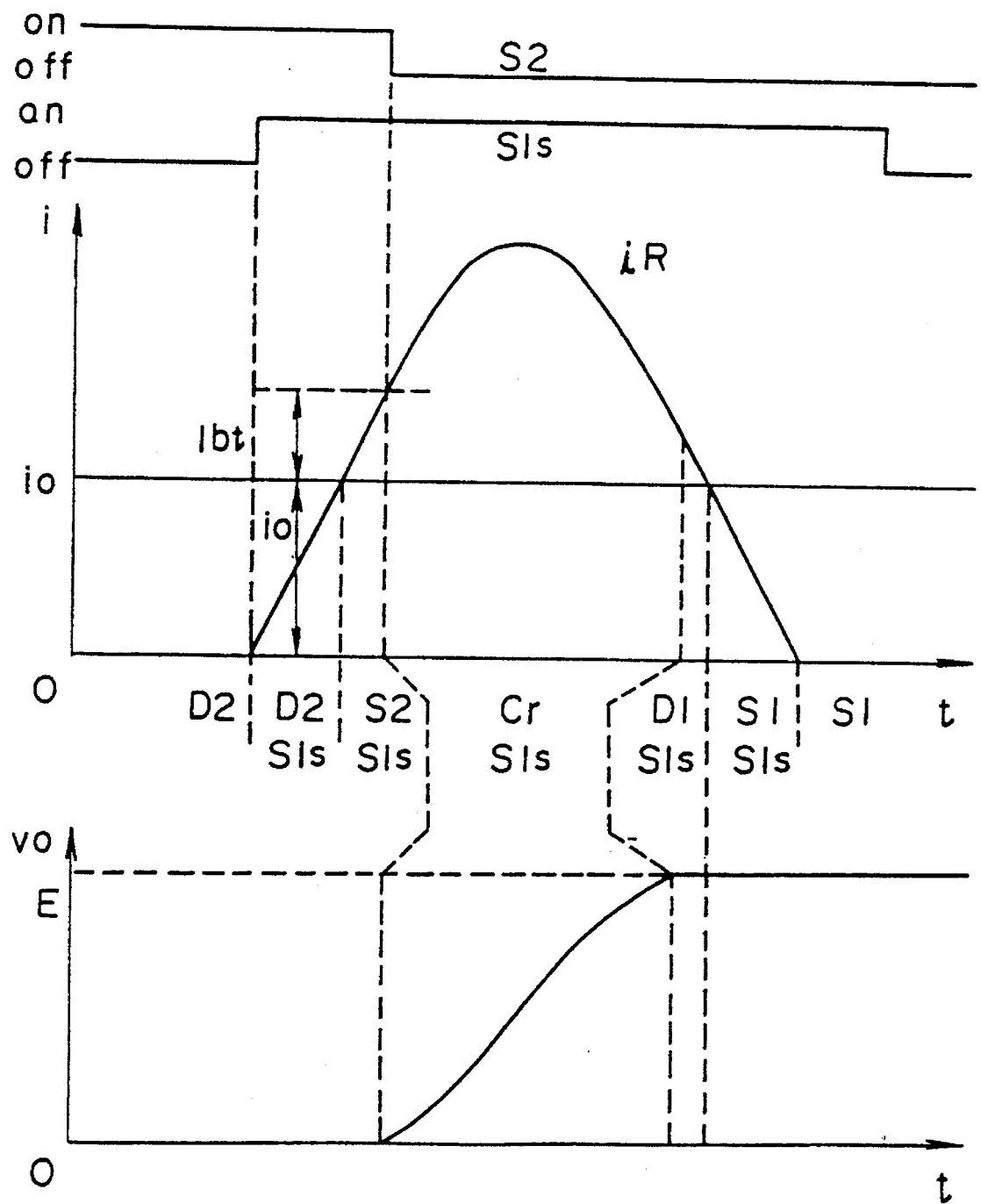
FIG. 14 is a characteristic diagram to show an operation mode of the conventional type of resonant commutated pole.

The sixth embodiment of the present invention will be described by referring to FIG. 12, which is a circuit diagram to show a structure of this embodiment.

In this embodiment, instead of a 3-division of the DC power source as described in the first embodiment, an auxiliary DC power source is employed. A first auxiliary DC power source 20 is connected between a half-division point Ph of the DC power source E and a first auxiliary switch S1s. A second auxiliary DC power source 21 is connected between the half-division point Ph of the DC power source E and a second auxiliary switch S2s. The voltage of the first auxiliary DC power source 20 and said second auxiliary DC power source 21 1s set to adE−(½)E (see FIG. 1).

Accordingly, the voltage of the dividing point P10 corresponding to the dividing point P1 in the first embodiment, is given by (½)E+[adE−(½)E]=adE. The voltage of the dividing point P20 corresponding to the dividing point P2 in the first embodiment, is also given by (½)E–[adE–(½)E]= E–adE. Hence, in a similar manner to the first embodiment, the power source voltage for the resonant operation will be adE, which is of a value that is larger than (½)E.

The operational functions of the system of this embodiment are identical as those described in the first embodiment.

According to this described embodiment, in addition to the advantages that has been recognized in the first embodiment, this embodiment makes it possible to have the advantages of providing an inverter that can perform a stable operation with a simple control system by using batteries with which a 2-division potentials points can be set.

As have been described in the above, since the designed resonance operation during the commutation period can be stably performed being independent of a turn-off timing of the main switch, the present invention can have the advantages of being capable to provide a high efficient quasi-resonant PWM inverter with a simple control system. Moreover, this invention makes it possible to get the benefits of constructing easily a single-phase inverter, a 3-phase converter, a chopper circuit, as well as a 3-phase PWM converter and to perform a stable circuitry operation.

While this invention has been described in detail with respect to the preferred embodiments, it should be understood that the invention is not limited to that precise embodiments; rather many modifications and variations would present themselves to those of skill in the art without departing from the scope and spirit of this invention, as defined in the appended claims.

What is claimed is:

1. A quasi-resonant PWM inverter comprising:

a first condensor having a first terminal connected to a connecting point between a first side of terminals of a first main switch and a second side of terminals of a second main switch, and a second terminal connected to a second side of terminals of said first main switch;

a second condensor connected between said connecting point and a first side of terminals of said second main switch;

a DC power source connected between the second side of terminals of said first main switch and the first side of terminals of said second main switch; said DC power source having a first dividing point with a first potential and a second dividing point with a second potential;

a first auxiliary switch having first and second sides of which the second side is connected to said first dividing point;

a second auxiliary switch having first and second sides, said first side connected to said second dividing point; and a reactor connected between a connecting point to connect the first side of terminals of said first auxiliary switch to the second side of terminals of said second auxiliary switch, and said connecting point to connect the first and second main switches.

2. A quasi-resonant PWM inverter comprising:

a first condensor having a terminal connected to a connecting point between a first side of terminals of a first main switch and to a second side of terminals of a second main switch, and a terminal connected to a second side of terminals of said first main switch;

a second condensor connected between said connecting point and a first side of terminals of said second main switch;

a DC power source connected between the second side of terminals of said first main switch and the first side of terminals of said second main switch, said DC power source having half-dividing points;

first and second auxiliary power sources connected to the half-dividing points for said DC power source to form a first potential point having a first potential and a second potential point having a second potential;

a first auxiliary switch having first and second sides the second of which is connected to said first potential point;

a second auxiliary switch having first and second sides and the first of which is connected to said second potential point; and a reactor having a terminal connected to a connecting point between the first side of terminals of said first auxiliary switch to the second side of terminals of said second auxiliary switch, and another terminal connected to said connecting point between said first and second main switches.

* * * * *